June 3, 1958  H. BOIVIN  2,837,440
METHOD OF PRODUCING AIR PERVIOUS MATERIAL BY TREATING
WITH GAS EVOLVING BLOWING AGENT AND COATING
WITH A WASHABLE SALT LAYER
Filed June 13, 1956  2 Sheets-Sheet 1
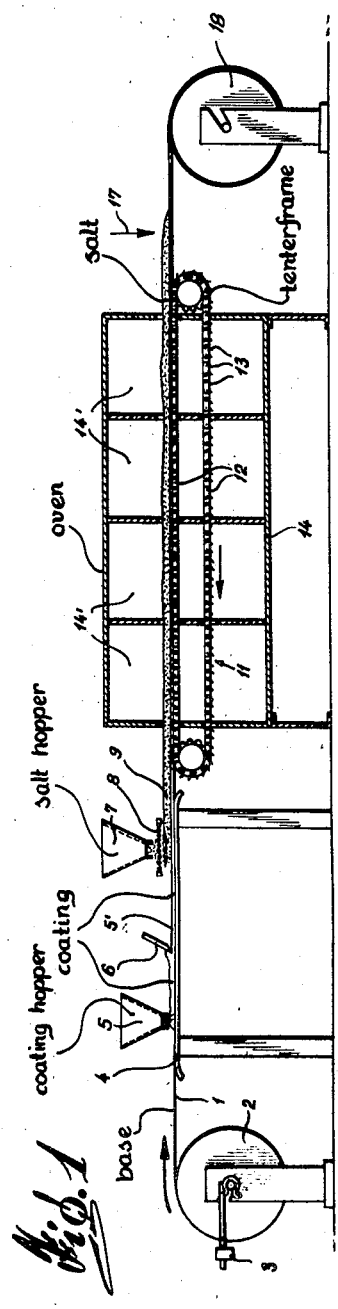
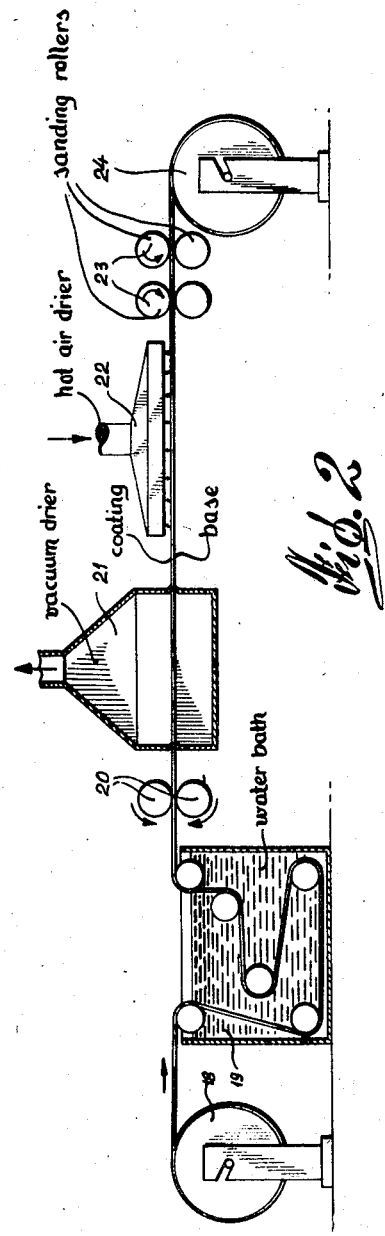
INVENTOR
Horace BOIVIN
BY
ATTORNEYS June 3, 1958 H. BOIVIN 2,837,440
METHOD OF PRODUCING AIR PERVIOUS MATERIAL BY TREATING
WITH GAS EVOLVING BLOWING AGENT AND COATING
WITH A WASHABLE SALT LAYER
Filed June 13, 1956 2 Sheets-Sheet 2

INVENTOR
Horace BOIVIN

BY
ATTORNEYS

United States Patent Office 2,837,440
Patented June 3, 1958

2,837,440

METHOD OF PRODUCING AIR PERVIOUS MATERIAL BY TREATING WITH GAS EVOLVING BLOWING AGENT AND COATING WITH A WASHABLE SALT LAYER

Horace Boivin, Granby, Quebec, Canada

Application June 13, 1956, Serial No. 591,023

3 Claims. (Cl. 117—7)

The present invention relates to composite fabrics, coated with an outer layer or film of a plastic compound. More particularly, the invention relates to such coated fabrics having greatly improved properties and characteristics.

The fabrics in question have been known, generally speaking, for a long time and became quite popular for various purposes. The so-called oilcloths still used for table coverings are of this general type: they are constituted of a woven fabric, generally cotton, coated on one side with a waterproof, impermeable linseed-oil base film carrying if desired printed, or embossed, designs.

The same general idea, carried still further on heavier fabrics and with thicker, pressed or corrugated coatings, produced the upholstering materials known under the trade names of "Leatherette," "Fabrikoid" and many others, so widely used as a substitute for leather that they became household terms.

Said coated fabrics are extremely useful, they are tough, readily washable, have a reasonably long life and are relatively inexpensive.

Unfortunately, however, they all share many disadvantages in common, whether the coating is a linseed oil base, a rubber composition or the more recent and modern plastics such as the polyvinyl resins.

The disadvantages in question can be enumerated as follows:

(1) Being constituted of a woven fabric, further stiffened by its outer coating, the product is non-stretchable and stiff. For upholstering purposes this is a serious drawback because the material is hard to shape, necessitating pleated corners apt to crack or wear prematurely.

(2) The shiny surface has a gloss all its own, quite unlike any other material, thereby betraying its origin and rendering it unsuitable for various decorative effects. Also, this surface tends to feel cold and "clammy," especially in hot, humid weather.

(3) The dense, impermeable coating of those fabrics does not allow the passage of water vapour and, hence, "do not breathe." In the vocabulary of textile people, this means that such a fabric cannot absorb perspiration and, consequently, becomes hot and damp when used on seats or couches. In warm climates this is a serious disadvantage.

The present invention has been conceived to avoid the difficulties noted above and its main objective may be stated as follows:

To provide an improved, stretchable coated fabric having a distinctive finish and lending itself well to an endless variety of decorative purposes for table, wall, furniture coverings and even for footwear and garments.

Another highly important object is the provision of a product as defined above which, in addition, would be porous and endowed with that highly desirable "breathing" property. Still another object envisages a fabric having the above-noted qualities and, yet, be tough, wear-resistant, highly washable and water repellent.

And, as another object, the invention contemplates the improved fabric above which can be produced easily at moderate, competitive cost and lends itself well to decorative, printed, designs.

The material of the invention is a coated fabric having a finish very closely resembling suede leather; the "feel" is the same, it is pliant and soft like suede and is stretchable in approximately the same proportions. This material is a perfect substitute for said suede but has properties of its own in addition to those noted above.

For instance, it can be cleaned with soap and water, it resists abrasion to a high degree and is very porous; cigarette smoke can be blown therethrough.

The results above are obtained by a coating process comprising the conventional step of distributing uniformly a thermoplastic compound over a cotton or other textile base; the departures from this basic step are of the utmost importance and constitute the novel steps of the invention.

The first important difference from conventional procedure is the use of a knitted fabric for the base; this is known as a "jersey" fabric or cloth in the trade, this fabric being stretchable in both dimensions but more so widthwise.

Inherently, this jersey fabric is a flabby fabric having no body of its own, with a strong tendency to curling when stretched lengthwise.

Heretofore, attempts to coat such a jersey have failed; in a conventional coating machine the fabric is advanced by rolls and kept under tension lengthwise. Consequently, a woven, weft and warp fabric is invariably used for conventional coated fabrics.

Attempts to use a jersey cloth in such a manner have failed because the cloth tends to curl upon itself, gradually shrinks under the filling action of the coating substance, said substance finally closing the pores of the cloth and cancelling its elasticity so that, in the final analysis, there is little advantage in using jersey in the usual processes.

According to the invention, this difficulty is solved by stretching the cotton jersey laterally and keeping it stretched during the entire coating, fusing, curing and drying steps. This stretching, in itself, is not sufficient; the coating step must be accurately controlled.

This coating is done in two separate stages: the first stage consists in depositing a thin layer of a thickened paste of a thermoplastic material, that is: one that contains controlled amounts of a plasticizer, whereby the said first coat does not penetrate too deeply into the fabric, but remains more or less on the surface thereof. Thus the desired effect is one compromising between penetration into the fabric and proper adherence of the coating thereto. The object of this undercoating is to retain as much elasticity of the cloth backing as possible.

The coated fabric so obtained is more elastic than ordinary ones but its finish is much the same: a glossy surface having no particular appeal. To improve his surface, graining is usually resorted to, the most common being an imitation of leather.

Lately, a treatment has been given to coated fabrics which imitates suede leather, said treatment consisting in depositing common salt on the surface of the pasty coating, prior to curing.

Thereafter, this salt is removed and the fabric washed to dissolve embedded salt grains, whereby the finished surface is closely indented by a great number of small craters; the result is an approximation of suede leather.

Even so, this suede-like fabric is impermeable to fluids and given it "breathing" properties has been a long-sought goal.

Plasticized fabrics have been rendered more or less pervious by a process wherein quantities of small, heated, needles perforate the plastic film. Thus, rubberized fabrics have been successfully made which allow passage of vapours resulting from body perspiration. However, this piercing method is limited in scope by the very size of the needles and the mechanical limitations inherent to their grouping. Consequently, the said method is, perforce, applicable only to limited use, especially grained leather effects such as a pigskin-like imitation leather.

When producing rubber and plastic sponges a material known as a "blowing agent" has been used successfully. Such a "blowing" agent is a finely granulated salt, incorporated in the coating mass and spontaneously decomposed into gas at a certain temperature, comprised within the curing or polymerizing range of the coating film.

For opening up the mass of the coated film, so as to render the same pervious to fluids, such an agent has been tried to disrupt the homogeneity of the normally, dense, impermeable film.

Under specific conditions this blowing agent will cause a somewhat porous coating to be obtained which, however, is useless for most purposes, its surface being rough, unattractive and almost impossible to finish properly.

Attempts to finish this blown material in conventional manner, by graining for instance, have caused closing of the pores and resulted in a fabric having no breathing properties.

Experiments conducted assiduously for two years have shown conclusively that a properly breathing, stretchable coated fabric cannot be obtained with any procedure above described.

In order to produce a perfect material suitable for the most exacting upholstering requirements, garment and shoe making, the specific steps of the process of the invention will now be described.

As disclosed previously, the fabric used is a jersey cloth, preferably of cotton, although other natural or synthetic textile fibres can be used which resist successfully temperatures up to 400° F., maximum.

This jersey is coated then stretched laterally and longitudinally and the first coating is applied in such a manner as to form an undercoating for the successive and final coat.

The coating procedure is rather special; it is conducted in a machine wherein the cloth is fed at one end, coated, salted, and heated until it reaches the other end, where it is rolled for further processing.

The coating machine generally follows normal design but is provided with a built-in pin tenter carrier for stretching the jersey cloth widthwise.

This pin tenter consists of an endless chain extending the entire length of the machine on each side, each chain having upstanding pins adapted to enter the selvage of the fabric, from underneath, round wire brushes serving as an upper support for the fabric, as the pin penetration in the selvage is carried out. Immediately after the point where the cloth has been pinned in place, the chains diverge laterally from each other, whereby to stretch the pinned cloth widthwise. This stretching being achieved, the chains are mounted to resume a parallel position for the rest of the cloth travel in the machine.

Thus, the cloth is stretched and maintained throughout in uniformly stretched condition.

The cloth to be coated is wound on a roller and selectively adjustable braking means are associated with said roller for tensioning the cloth. Said cloth is unwound from said roller and passed over a flat bed surmounted by a doctor blade. This blade is finely adjustable to regulate its distance over the bed and, hence, the thickness of the plastic paste flowed on the cloth. Immediately past the doctor blade, the uniformly coated cloth is salted, that is: a carefully controlled amount of fine common salt is sprinkled on the surface of the freshly deposited still-pasty coating. This salt is sprinkled from a suitable hopper, the amount and distribution being gauged accurately by shaking screens.

So far, the device described is more or less conventional. The departure from accepted practice is the tenter carrier already explained.

After salting, the cloth is pinned onto the tenter and carried inside a tunnel consisting of several adjacent chambers wherein various temperatures are maintained for curing the coating.

When using polyvinyl chloride the temperature is increased from 250° F. to 375° F., in four separate steps of about 25° each.

At the end of the machine the coated fabric emerges with the deposited salt, which is removed, and the fabric wound on a spindle. This wound fabric is then washed to remove the salt, the water is vacuum extracted and a more complete drying effectuated with warm air in a tenter frame.

This completes the undercoating operation; this is repeated a second time, with a more fluid coating composition for the final coating.

When compounding the coating composition the blowing agent is incorporated, in a proportion of about ½ to 1 percent.

Due to the presence of this blowing agent, together with the salting, an excellent porous material is obtained, having a surface already simulating a suede-like finish.

A perfect suede effect is obtained by means of a final treatment consisting in a superficial sanding operation. This is effectuated by a pair of oppositely rotating rollers covered with sand paper. A final washing, vacuum extraction and drying, followed by a water-repellent application completes the process.

The "sanding" operation could be performed as well with rotating stones, abrasive wheels or the like. A slightly different finish can be had with wire brushes.

As mentioned previously, the blowing agent is incorporated in the coating mass and its effect, with the simultaneous action of the salt, combines to obtain the results according to the invention. Both the blowing and salting are necessary and indispensable, simultaneously.

Long observation, coupled with microscopic examination, show that the bubbles caused by the blowing agent, in the mass of the plastic coating do not, invariably, cause rupture of the bubbles cells whereas, when the salt is used, the indentations caused thereby reach sufficiently deep in the mass of the coating to reduce, correspondingly, the effective thickness through which the blowing agent acts. In other words, due to the presence of the millions of craters caused by salting, the blowing agent is better adapted to foam the plastic coating by allowing the blowing gas to escape through said craters. The result is a very uniform distribution of small sized, closely adjacent, cells imparting to the finished material a high order of porosity.

The final sanding operation is also important in that it opens up, by abrasion, whatever gas bubbles may remain occluded, immediately below the surface of the film, between adjacent craters.

Furthermore, the said abrasive step removes irregularities of the surface, shreds of ruptured cells and other fine surface debris. At the same time, the abrasion step scores the portions of the film surface that may have remained bright, pulls tiny slivers of the coating and generally conditions the surface to resemble suede.

Of the various plastic substances that are suitable for this process, polyvinyl chloride is favored because it is available at commercially low cost and its characteristics are now well known.

Rubber and compositions thereof can be used also, as well as other plastics such as polyethylene and the like.

The only requirement is that the compound used be flexible, tough, reasonably resistant to acids and alkalis, waterproof and apt to be coated in paste form and to cure rapidly under heat.

When polyvinyl chloride is used, the curing time is about 90 seconds, at temperatures ranging between 250° to 375° F.

The salting operation is performed with common salt (sodium chloride) of a size corresponding to a minimum mesh of 60 to the inch to about 100 to the inch.

The distribution of this salt is important: it must be quite uniform and the salt thickness, sifted onto the plastic paste, must represent at least 15 to 20 times the thickness of the spread plastic. Apparently, a given weight of salt must be sifted to force the underlying grains into the mass of the plastic coating, to obtain good, well-defined, craters.

Depending on the plastic chosen for the coating, the compounding formulas will vary: in the case of the polyvinyl chloride (obtainable in granular form) the following formula has given excellent results:

| | Lbs. |
|---|---|
| P. V. C. Geon 121 (polyvinyl chloride) | 100 |
| Plasticizer-Paraplex G. 62 | 100 |
| Filler (calcium carbonate) | 3 |
| Color pigment (powder) | 2 |
| Stabilizer Ferro 1203 | 3 |
| Dryer Santocel 54 | 3 |
| Common salt | 30 |
| Blowing agent (Du Pont BL 353) | About 1.1 |

P. V. C. Geon 121 is a trademark owned by the B. F. Goodrich Chemical Co. and designates a polyvinyl chloride.

Paraplex G 62 is a trademark owned by the Rohm & Haas Co. and designates an alkyl plasticizer.

Ferro 1203 is made by Ferro Enamels (Canada) Ltd. and is a solution of a barium-cadmium salt of a carboxylic acid.

Santocel 54 is made by Monsanto Chemical.

Du Pont BL 353 is a blowing agent of the nitrogen type made by Du Pont de Nemours (composition 70% N.N. dimethyl-N.N. dinitroso terephthalamide (NTA) and 30% mineral oil).

All the ingredients above are ground together between rollers, in a paint mill, the purpose being to incorporate the components of the paste into a smooth, homogeneous whole. Whether the paste is used for the first or second run in the machine, more or less filler and/or plasticizer is added for proper consistency.

This paste must be used within a few hours because the unstable blowing agent (BL 353) tends to decompose spontaneously, even without heat, so that the composition becomes stale after 24 hours or so.

Summing up the process described, the following steps and precautions must be observed:

The fabric used is a jersey of cotton or the like, coated with a suitable paste, the thickness of this coating adjusted, and a layer of common salt, finely divided, uniformly distributed over the said coating.

The jersey is then stretched and maintained in stretched condition during the entire fusing and drying operation.

A blowing agent has previously been incorporated to the paste, said agent becoming strongly active at about 250° F.

The coated fabric is then subjected to successively increased temperatures, in steps of 25° F. or so, in four separate heated chambers, from 250° F. to a final 375° F. The total time of heating is about 90 second. Those figures apply to a polyvinyl chloride coating compounded as above described.

The method practiced in this invention and the product obtained thereby will be described more fully in connection with the accompanying drawings in which:

Figure 1 is a schematic view, in elevation, illustrating a method and means by which the improved composite fabric may be produced;

Figure 2 is a similar schematic view, in elevation, illustrating certain steps and means employed in a subsequent stage of the improved method;

Figure 3:
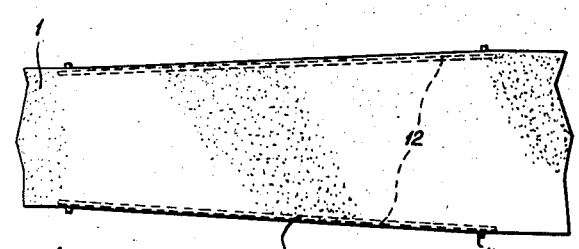
Figure 3 is a plan view showing schematically the devices of Figure 1.

Referring now to the drawings in which like reference characters indicate like elements and, more particularly, referring to Figures 1 and 3, the base fabric 1, which preferably consists of a jersey knitted cloth, is unwound from a supply roll 2, the axle of which is provided with an adjustable breaking arrangement, such as a sliding weight on a brake arm, arranged to maintain a certain tension on the fabric 1. The fabric 1 is supported from underneath on a table 4, and the paste of thermoplastic material is discharged onto the fabric 1 from a hopper 5 or other similar device, and the thickness of the paste coating 5' is adjusted and made uniform by a doctor blade 6, which is preferably provided with means for adjusting the gap between its edge and the fabric 1 supported on the table 4. The paste-coated fabric then passes underneath a hopper 7, containing granular salt which is discharged onto the paste coating 5' through vibrating screens 8, so as to deposit and sprinkle on the paste coating 5' a uniform layer 9 of salt which has a thickness about 15 to 20 times the thickness of the coating 5' of the thermoplastic material, then the fabric is stretched transversely by means of a tenter frame, generally indicated at 11, and which consists of suitable conveyor chains 12 provided with needles 13 engaging through the edges of the fabric 1. The conveyor chains are arranged to diverge at any appropriate angle so that as the fabric is carried along by the needles 13 it will be stretched widthwise to the desired extent. The fabric may be attached by hand on the needles 13 or a suitable mechanism, not shown, may be used to attach said fabric automatically. While still on the tenter frame 11, the coated and salted fabric 1 passes through an oven 14, which is separated into four compartments 14', maintained at temperatures successively increasing from the first compartment to the last compartment in steps of 25° F., the first compartment being maintained at a temperature of substantially 250° F. and the last chamber being at a final 375° F. During passage through the oven 14, the polyvinyl is fused and the blowing agent incorporated in said polyvinyl is activated. Upon issuing from the oven 14, the salt is removed by any suitable mechanical means at 17, and then the coated fabric is wound on the takeup roll 18.

The roll of coated fabric 18 is then carried to the washing and drying arrangement illustrated in Figure 2. The coated fabric is first passed through a water bath 19 and is positively driven by rollers 20 to pass through a chamber 21 in which a vacuum is maintained for vacuum drying the wet fabric, then the fabric passes underneath a hood 22 supplying hot air to the fabric to finally dry the same. The dried coated fabric may be reprocessed through the machine of Figure 1 to apply a second coating of the paste which has a more fluid consistency than the first coating. The second coating is washed and dried as per the apparatus of Figure 2, and finally its exposed surface is subjected to a sanding operation, as by means of sanding rollers 23 rotating against the exposed face of the coating of the fabric. The fabric is finally wound on takeup roller 24.

Figure 4:
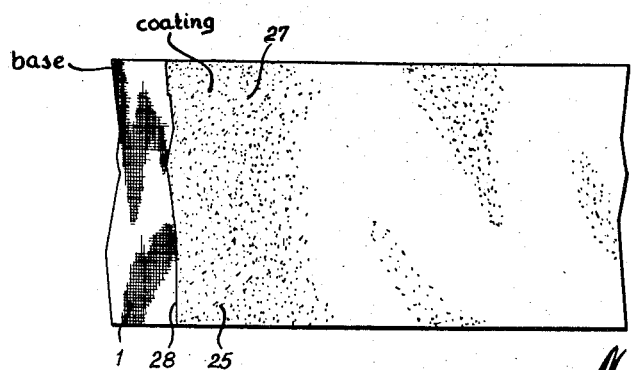
Figure 4 is a plan view of the product of the present invention on an enlarged scale.
Figure 5:
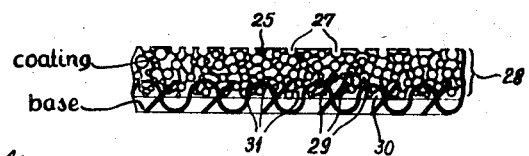
Figure 5 is a cross-section of the product on an enlarged scale.

Referring to Figures 4 and 5, it will be seen that the exposed face 1 of the coated fabric has a plurality of very small crater-like depressions 27 which are irregularly disposed over the entire surface of the fabric, thereby imparting to the fabric a suede leather-like finish.

Referring to Figure 5, it will be seen that the coating 28 has a substantially uniform thickness and that the grains of salt were dissolved during washing to leave, after the washing operation, relatively large air cells 29, which communicate with each other and with the outer exposed face of the coating 28 and the underface 30 of said coating through small microscopic air passages 31, which were produced by the blowing agent incorporated in the initial thermoplastic paste. The air passages 31, coupled with the air cells 29, confer porosity and air perviousness to the coating 28, making the composite fabric breathable.

The following example illustrates the method in accordance with the present invention:

A composition was made by mixing the following materials together:

| | Parts by weight |
|---|---|
| Granular polyvinyl chloride | 100 |
| Alkyl plasticizer | 100 |
| Calcium carbonate filler | 3 |
| Titanium dioxide (colour pigment) | 2 |
| As a stabilizer, a solution of a barium-cadmium salt of a carboxcylic acid | 3 |
| Dryer Santocel 54 made by Monsanto Chemical | 3 |
| Sodium chloride | 30 |
| Blowing agent (Du Pont BL 353) | 1.1 |

This mixture was then transferred to a paint mill to form a paste of smooth and homogeneous consistency, a circular knitted cotton fabric having a double yarn and of a weight of about 7 oz. per square yard was used as the fabric. The knitted fabric was run through the machine illustrated in Figures 1, 2 and 3, wherein the fabric is indicated by reference numeral 1, and the thermoplastic composition referred hereinabove was fed onto said fabric through a hopper indicated at 5. The resulting product has a suede leather-like appearance, is soft and pliable and breathable. It was then subjected to a flexing test and showed breakage at 200,000 flexing cycles. It was also subjected to a folding test and showed breakage after 50,000 folding cycles. It showed a tensile strength in the direction of the wales of the fabric of about 80 lbs. It showed a percentage stretch in the direction of the wales of the fabric of about 35%. Its breathing quality was demonstrated by the fact that water vapour passed through the same at a rate of 3.33 grams per square foot per hour.

The product obtained has a suede finish, feels like suede and is likewise stretchable. It is perfectly adapted to upholstering of the highest quality.

Its stain-resisting properties, coupled with a suitable, conventional, water-repellent spraying, confer qualities to the fabric of the invention which are unequalled for modern automobile upholstering.

As a matter of fact, the material in question has proven so promising that a special "Plymouth" automobile has been upholstered with said material by the Chrysler Corporation, with stunning results.

For automobile upholstering the combined elasticity and pliancy of the material, combined with perfect "breathing" properties and washability constitute an ideal, long-sought combination.

The method according to the present invention may be used in conjunction with a backing made of natural or synthetic fibers including glass fibers and a coating made of a resin such as acrylic resins, cellulose acetate, cellulose nitrate, cellulose acetate butyrate, chlorinated rubber, ethyl cellulose, polyethylene, silicones, and polyvinyl resins, such as polyvinyl acetate, chloride, butyrate and polyvinyl acetate chloride copolymer.

It must be understood that various modifications may be resorted to without departing from the spirit and scope of the appended claims. For instance it is possible to use in the process of the present invention a backing consisting of a woven non-stretchable fabric, in which case a non-stretchable coated fabric will be obtained which will still have the property of breathing.

I claim:

1. A method for producing an air pervious, flexible sheet material having a washable and wear resistant top layer with a suede leather-like finish, comprising the steps of preparing a plastisol formulation, incorporating into said plastisol formulation a nitrogen type blowing agent in the proportion of ½ to 1% by weight of the total plastisol formulation, milling the resultant mixture to a homogeneous consistency and fine particle size applying and spreading the mixture in the form of a paste onto a textile fabric backing, at a temperature below the activation temperature of the blowing agent, to form a continuous opaque coating on said backing, sprinkling onto the top surface of the uncured coating an inert, granulated, water soluble material of fine particle size to form a uniform layer of a depth of from 15 to 20 times the thickness of the uncured coating, dimensionally stabilizing said coated backing and heating the same to a temperature to fuse and dry the coating and to cause said blowing agent to produce gas evolution through the mass of said coating, removing the inert material sprinkled on the outer face of the coating, washing the resulting coated and cured fabric in water and drying the same.

2. The method of making an air pervious, flexible sheet material comprising the steps of spreading on a textile fabric a uniform coating of a pasty, plastisol composition incorporating a blowing agent, depositing on the uncured layer of the plastisol a layer of an inert, granular, water soluble material of a thickness substantially equal to 15 to 20 times the thickness of the plastisol coating so that the weight of the inert, granular, water soluble material will cause partial penetration of the particles of said material next to said coating into said coating of pasty, uncured plastisol, then heating the resulting assembly to a temperature to fuse the plastisol and cause activation of the blowing agent to produce gas evolution through the mass of the coating, said layer of inert material acting like the wall of a mould to cause the formation of a substantially smooth, outer surface on said coating despite the gas evolution by said blowing agent, whereby the cured plastisol coating, after removal of the top layer of inert material, will have a smooth, outer surface with small crater-like depressions imitating suede leather, said coating being air pervious due to micropores left by said blowing agent, said micropores in communication with each other to form air passages opening at the top and bottom surfaces of said coating.

3. A method of making a flexible, stretchable and breathable fabric comprising mixing together polyvinyl chloride and a substantially equal amount of an alkyl plasticizer, a stabilizer agent and a drier agent, about 15% of a granular water soluble material and a nitrogen type blowing agent in a proportion of ½ to 1% weight of the total mixture, milling the resultant mixture to a homogeneous consistency of very fine particles, applying and spreading the mixture onto a stretchable knitted cloth backing at a temperature below the activation temperature of the blowing agent to form a continuous coating on said backing, adjusting the thickness of said coating to a uniform, constant value substantially equal to the thickness of said backing, sprinkling onto the outer face of the uncured coating an inert, granulated, water-soluble material of fine particle size and to a depth of from 15 to 20 times the thickness of the coating, stretching said fabric widthwise in the direction of the courses of the knitted backing, while tensioning said backing lengthwise and heating said dimensionally stabilized coated backing in successive steps of substantially 25° F., from 250° F. to 375° F. to fuse and dry said coating, while causing said blowing agent to produce gas evolution through the mass of said coating, removing the inert materials sprinkled on the outer face of the coating, washing the resulting coated fabric in water, drying the same while in stretched condition, sanding the outer face of the cured coating.

(References on following page)

References Cited in the file of this patent

UNITED STATES PATENTS

| | | | |
|---|---|---|---|
| 2,228,735 | Spraragen | Jan. 14, | 1941 |
| 2,397,838 | Chavannes | Apr. 2, | 1946 |
| 2,434,111 | Hawley et al. | Jan. 6, | 1948 |
| 2,517,646 | Ewing | Aug. 8, | 1950 |
| 2,574,200 | Teague | Nov. 6, | 1951 |
| 2,649,391 | Alderfer | Aug. 18, | 1953 |
| 2,719,795 | Nottebohm | Oct. 4, | 1955 |
| 2,735,786 | Schramm | Feb. 21, | 1956 |
| 2,737,503 | Sprague et al. | Mar. 6, | 1956 |